United States Patent
Kuwahara (10) Patent No.: US 10,894,367 B2
(45) Date of Patent: Jan. 19, 2021

(54) METHOD AND APPARATUS FOR PRODUCING THREE-DIMENSIONAL DECORATION PIECE MADE OF THERMOPLASTIC SYNTHETIC RESIN

(71) Applicants: Nubuo Kuroda, Osaka (JP); Eiji Kuwahara, Osaka (JP)

(72) Inventor: Eiji Kuwahara, Osaka (JP)

(73) Assignee: Takeshi Kuroda, Osaka (JP)

( * ) Notice: Subject to any disclaimer, the term of this patent is extended or adjusted under 35 U.S.C. 154(b) by 348 days.

(21) Appl. No.: 15/687,837

(22) Filed: Aug. 28, 2017

(65) Prior Publication Data
US 2017/0355148 A1  Dec. 14, 2017

Related U.S. Application Data (60) Division of application No. 14/302,033, filed on Jun. 11, 2014, now abandoned, which is a continuation of
(Continued)

(51) Int. Cl.
*B29C 65/04* (2006.01)
*B29C 35/12* (2006.01)
(Continued)

(52) U.S. Cl.
CPC .............. *B29C 65/04* (2013.01); *B29C 35/12* (2013.01); *B29C 43/40* (2013.01); *B29C 43/52* (2013.01);
(Continued)

(58) Field of Classification Search
CPC .......... B29C 65/04; B29C 35/12; B29C 59/16
See application file for complete search history.

(56) References Cited

U.S. PATENT DOCUMENTS 3,865,662 A  2/1975 Segal
3,953,280 A  4/1976 Brophy et al.
(Continued)

FOREIGN PATENT DOCUMENTS

EP  0 724 948 A2  8/1996
EP  1 813 416 A1  8/2007
(Continued)

OTHER PUBLICATIONS

Dec. 23, 2016 European Search Report issued in Application No. 10852510.6.
Apr. 28, 2017 Office Action Issued in U.S. Appl. No. 14/302,033.

*Primary Examiner* — Barbara J Musser
(74) *Attorney, Agent, or Firm* — Oliff PLC (57) ABSTRACT

A method and an apparatus for producing a three-dimensional decoration piece that does not damage the tacky bonding or adhesion strength of the lower layer material of the decoration piece. The method includes putting an upper layer material on a first table operating as cathode; lowering an upper mold operating as anode onto the first table, emitting a high frequency wave for dielectric heating; stopping the high frequency dielectric heating; moving a second table carrying a lower layer material having a tacky bonding property to below the upper mold; and lowering said upper mold onto the second table. In the apparatus, the second table or the lower mold is provided on the top surface thereof with recessed sections that are transversally and inwardly separated from a position where an edge of the first machining means contacts, by 0.2 mm to 1 mm; and a cushion member being arranged in the respective recessed sections.

4 Claims, 12 Drawing Sheets

Related U.S. Application Data application No. 13/698,815, filed as application No. PCT/JP2010/059377 on Jun. 2, 2010.

(51) Int. Cl.

| | |
|---|---|
| *B29C 43/40* | (2006.01) |
| *B29C 43/52* | (2006.01) |
| *B29C 59/02* | (2006.01) |
| *B29C 65/74* | (2006.01) |
| *B29C 65/36* | (2006.01) |
| *B29C 59/16* | (2006.01) |
| *B44C 1/00* | (2006.01) |
| *B29C 35/08* | (2006.01) |
| *B29L 31/00* | (2006.01) |
| *B29C 65/00* | (2006.01) |

(52) U.S. Cl.
CPC .............. *B29C 59/02* (2013.01); *B29C 59/16* (2013.01); *B29C 65/366* (2013.01); *B29C 65/3676* (2013.01); *B29C 65/7441* (2013.01); *B29C 66/1122* (2013.01); *B29C 66/30621* (2013.01); *B29C 66/433* (2013.01); *B29C 66/4724* (2013.01); *B29C 66/73921* (2013.01); *B29C 66/81427* (2013.01); *B29C 66/81431* (2013.01); *B29C 66/81457* (2013.01); *B29C 66/8322* (2013.01); *B44C 1/005* (2013.01); *B29C 59/026* (2013.01); *B29C 66/71* (2013.01); *B29C 66/72328* (2013.01); *B29C 66/81415* (2013.01); *B29C 2035/0811* (2013.01); *B29L 2031/722* (2013.01); *B29L 2031/744* (2013.01); *Y10T 156/1039* (2015.01)

(56) References Cited

U.S. PATENT DOCUMENTS

| | | |
|---|---|---|
| 4,684,426 A | 8/1987 | Takayama |
| 4,737,231 A | 4/1988 | Seko et al. |
| 5,143,672 A | 9/1992 | Kuwahara |
| 5,834,037 A | 11/1998 | Wu |
| 6,739,367 B1 | 5/2004 | Totani |
| 2007/0296118 A1 | 12/2007 | Kuwahaha |
| 2009/0084505 A1 | 4/2009 | Suzuki |
| 2010/0143695 A1 | 6/2010 | Ogawa et al. |

FOREIGN PATENT DOCUMENTS

| | | |
|---|---|---|
| GB | 477 662 | 1/1938 |
| JP | H7-102620 B2 | 11/1995 |
| JP | H10-151675 A | 6/1998 |
| JP | 3235943 B2 | 9/2001 |
| JP | 2007-301831 A | 11/2007 |
| JP | 2008-030199 A | 2/2008 |
| JP | 4227587 B2 | 12/2008 |

METHOD AND APPARATUS FOR PRODUCING THREE-DIMENSIONAL DECORATION PIECE MADE OF THERMOPLASTIC SYNTHETIC RESIN

This is a divisional of application Ser. No. 14/302,033 filed Jun. 11, 2014 which is a divisional of application Ser. No. 13/698,815 filed Nov. 19, 2012, which is a National Stage Application of PTC/JP2010/059377 filed Jun. 2, 2010. The entire disclosures of the prior applications are hereby incorporated by references in their entirety.

TECHNICAL FIELD

This invention relates to a method and an apparatus for producing a three-dimensional decoration piece of thermoplastic synthetic resin that is to be fitted to, an automobile, a bicycle, a motor boat, an office automation apparatus, a home electric appliance, a sporting tool, a machine or the like, by means of a tacky adhesive agent or a bonding agent.

BACKGROUND ART

Various methods employing a metal mold and high frequency dielectric heating have been proposed as methods for producing a three-dimensional decoration piece of synthetic resin to be used as emblem or the like (see, inter alia, Patent Documents Nos. 1, 2 and 3 listed below).

However, with the invention disclosed in Patent Document No. 2, the three-dimensional decoration piece is produced by using an indented mold and a protruding mold, and the piece is produced between the indented mold and the protruding mold. Thus, a rear surface of the produced piece is not flat hut recessed. Therefore, an area to be bonded or tackily bonded to an object to be decorated is rather small, and hence does not provide satisfactory bonding (tacky bonding) strength.

With the invention disclosed in Patent Document No. 2, when a three-dimensional pattern on an upper surface of a polyurethane film is formed by an engraving die, the engraving the heats and presses the three-dimensional decoration piece entirely, so as to damage the tacky adhesive effect of the adhesive layer formed on the rear surface of the decoration piece.

The invention disclosed in Patent Document No. 3 provides a flat adhesive layer on the rear surface of the decoration piece to be produced. However, it has been found that the original tacky adhesive force is degraded under pressure, to reduce the tacky adhesion strength relative to the object to which the decoration piece is fitted almost by half. A number of experiments have proved that a tacky adhesive material and a tacky adhesive agents are degraded by heat, and a tacky adhesion strength is further reduced when pressure is applied thereto.

LIST OF PRIOR ART DOCUMENTS

Patent Documents

Patent Document No. 1: JP-B-H07-102620
Patent Document No. 2: JP-B-3235943
Patent Document No. 3: JP-B-4227587

SUMMARY OF THE INVENTION

Problem to be Solved by the Invention

Therefore, the object of the present invention is to provide a method and an apparatus for producing a three-dimensional decoration piece that do not damage the tacky bonding or adhesion strength of the lower layer material of the decoration piece.

Means for Solving the Problem

In the first aspect of the present invention, there is provided a method for producing a three-dimensional decoration piece of thermoplastic synthetic resin comprising:
putting an upper layer material on a first table operating as cathode;
lowering an upper mold operating as anode onto the first table to press the upper layer material, emitting a high frequency wave for dielectric heating, to form a three-dimensionally formed body from the upper layer material by molding and fusion-cutting and temporarily holding the three-dimensionally formed body to the upper mold;
stopping the high frequency dielectric heating;
moving a second table carrying a lower layer material having a tacky bonding property to below the upper mold temporarily holding the three-dimensionally formed body; and
lowering said upper mold onto the second table to press the three-dimensionally formed body, cutting the lower layer material and tacky bonding the three-dimensionally formed body and the lower layer material (Embodiment 1).

Preferably, an intermediate layer material is put on said first table;
said upper layer material is put on the intermediate layer material; and
said upper mold is lowered onto the first table to press said upper layer material and said intermediate layer material and emitting a high frequency wave for dielectric heating, to form the three-dimensionally formed body by fusion bonding said upper layer material and said intermediate layer material (Embodiment 2).

Preferably, the lower layer material having a releasing paper arranged to a rear surface thereof is put on said second table (Embodiment 3).

Preferably, after the cut the lower layer material, unnecessary parts thereof are removed, and an application film is adhered onto the top surface of the upper layer (Embodiment 4).

Preferably, a cushion member is arranged under the lower layer material in regions located outside areas where the lower layer material is cut, to absorb the pressure of the upper mold by the cushion member (Embodiment 5).

In a second aspect of the present invention, there is provided an apparatus for producing a three-dimensional decoration piece of thermoplastic synthetic resin, comprising:
an upper mold operating as anode, a first table operating as cathode and a second table,
said upper mold having a first machining means;
the first machining means fusion-cutting a material at the time of high frequency dielectric heating between the upper mold and the first table;
said first machining means cutting the material at the time of pressing between the upper mold and the second table;
said upper mold being provided on a bottom surface thereof with a temporary holding means;
said second table having a flat top surface;
said second table being provided on the top surface thereof with recessed sections, each of which being transversally and inwardly separated from a position where an edge of the first machining means contacts, by 0.2 mm to 1 mm;

a cushion member being arranged in the respective recessed sections (Embodiment 6).

There is also provided an apparatus for producing a three-dimensional decoration piece of thermoplastic synthetic resin, comprising:

an upper mold operating as anode, a first table operating as cathode, a second table, and a lower mold arranged on the second table;

said upper mold having a first machining means;

the first machining means fusion-cutting a material at the time of high frequency dielectric heating between the upper mold and the first table;

the first machining means cutting the material at the time of pressing between the the upper mold and the second table;

said upper mold being provided on a bottom surface thereof with a temporary holding means;

said lower mold having a flat top surface;

said lower mold being provided on the top surface thereof with recessed sections, each of which being transversally and inwardly separated from a position where an edge of the first machining means contacts, by 0.2 mm to 1 mm;

a cushion member being arranged in the respective recessed sections (Embodiment 7).

Advantages of the Invention

According to the inventions as defined in Embodiments 1 through 3 and 5 through 7, the lower layer material having a tacky bonding property is not subjected to any high frequency dielectric heating, and hence it is not heated. Therefore, the tacky bonding property of the lower layer material is prevented from being degraded.

According to the invention as defined in Embodiment 5, since the cushion member is arranged under the lower layer material, the tacky bonding property of the lower layer material is prevented from being degraded under pressure, so as to further prevent the tacky bonding property from being degraded effectively.

Since the cushion member is not arranged below the lower layer material at a portion where the lower layer material is cut, the lower layer material can be easily cut.

According to the invention as defined in Embodiment 6, since the cushion member is arranged at the above defined position on the top surface of the second table, the tacky bonding property of the lower layer material is prevented from being degraded under pressure. Additionally, since no cushion member is arranged under the cutting positions of the lower layer material, the lower layer material can be easily cut.

The invention as defined in Embodiment 7 provides an additional advantage that only the lower mold needs to be prepared separately when the pattern of the three-dimensional decoration piece is changed.

PREFERRED EMBODIMENT OF THE INVENTION

Three-Dimensional Decoration Piece

Firstly, a three-dimensional decoration piece which is produced by a method and an apparatus according to the present invention will be described.

Figure 12:
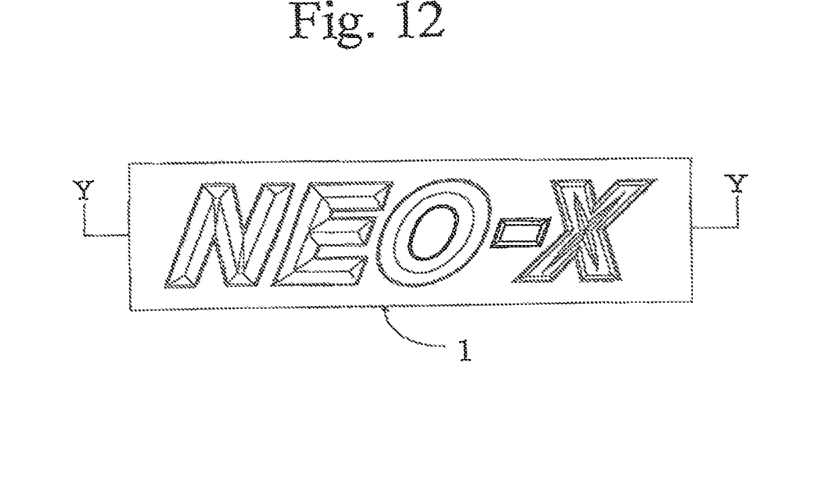
FIG. 12 is a schematic plan view of a three-dimensional decoration piece produced by a method according to the present invention.
Figure 13:
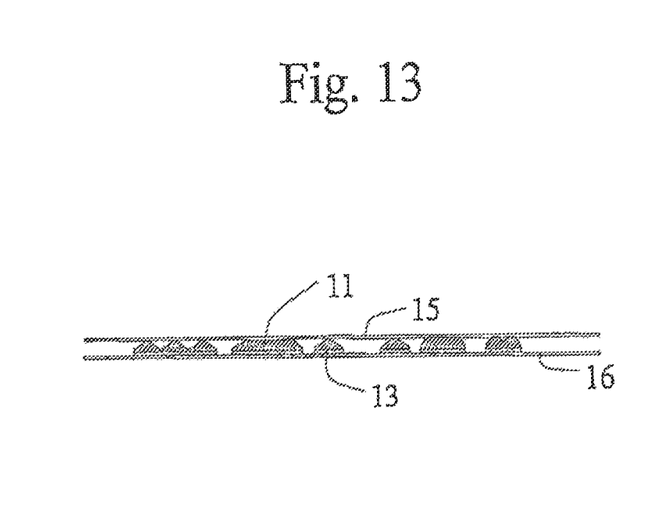
FIG. 13 is a schematic sectional view taken along line Y-Y in FIG. 12.

FIG. 12 is a schematic elevation of a three-dimensional decoration piece produced by a method and an apparatus according to the present invention. FIG. 13 is a schematic cross sectional view taken along line Y-Y in FIG. 12.

As shown in FIG. 13, the three-dimensional decoration piece comprises an upper layer 11 molded to show a three-dimensional shape, a lower layer 13 arranged under the upper layer 11 and having a tackily bonding function, an application film 15 arranged on a top surface of the upper layer 11 and a releasing paper 16 arranged under a bottom surface of the lower layer 13.

Since the lower layer 13 has an tackily bonding property, the releasing paper 16 is arranged under the lower layer 13, as will be described later.

The application film 15 may be a transparent resin film or a sheet of paper, a rear surface (bottom surface) of which a tackily bonding material is arranged. The three-dimensional decoration piece is protected by the applied application film. In addition, even if components (in the illustrated example, characters or symbols of N, E, O, - and X) are separated from one another, the relative positions of the components can be maintained.

A three-dimensional decoration piece produced by a method and an apparatus according to the present invention can be applied to any of various articles including automobiles, motor bicycles, motorboats, bicycles, office automation apparatus, electric home appliances, sporting tools and machines in order to decorate it.

Upper Layer

The upper layer 11 of a three-dimensional decoration piece is provided with a three-dimensional shape. The surface of the upper layer may be further decorated by, such as printing. The upper layer 11 is formed by a surface layer material 11 and an intermediate layer material 12a. As will be described later, the surface layer material 11a and the intermediate layer material 12a are fusion-bonded each other in the process of producing the three-dimensional decoration piece. In the illustrated example as explained below, the upper layer material comprises a surface layer material 11a and an intermediate layer material 12a, However, the intermediate layer material 12a is not essential, if a cavity of an upper mold 21 is filled with the surface layer material 11a (and hence the surface layer material 11a alone can provide the thickness of the three-dimensional decoration piece).

Surface Layer Material

The surface layer material 11a is a material to be used to make the surface of the three-dimensional decoration piece aesthetically appealing, and thermoplastic synthetic resin can be used for it. Any of known thermoplastic synthetic resin materials can be used for a three-dimensional decoration piece according to the present invention. Examples of known thermoplastic synthetic resin materials that can be used for the surface layer material include polyvinylchloride film, polyurethane film, polyester film and polyolefin film. The thermoplastic synthetic resin film to be used for the purpose of the present invention may be a laminate film.

Metal may be deposited on the thermoplastic synthetic resin film by evaporation by means of a known technique to provide an appearance like a metal-made three-dimensional decoration piece. Examples of metal deposited films that can be used for the purpose of the present invention include metal deposited polyvinylchloride film, metal deposited polyurethane film, metal deposited polyester film and metal deposited polyolefin film. Any known metal can be used for the purpose of the present invention, for example, aluminum, chromium, silver and tin.

The surface layer material 11a is appropriately selected depending on the three-dimensional decoration piece to be produced. The surface layer material may be further decorated by printing of a known technique.

Intermediate Layer Material

The intermediate layer material 12a is a layer for providing the three-dimensional decoration piece with a certain thickness and for preventing one or more than one voids from being formed in the decoration piece. Thermoplastic synthetic resin can be used for the intermediate layer material, for example, polyvinylchloride sheets, polyurethane sheets and polyolefin sheets etc.

Lower Layer and Lower Layer Material

The lower layer 13 is a layer for fitting the upper layer 11 onto an object to be decorated such as a car, and hence has an adhesive function or a tackily bond function. The lower layer is made of a lower layer material 13a.

The lower layer material 13a is a material having an adhesive function or a tackily bond function. Any known materials that can be used for fitting a three-dimensional decoration piece to the object to be decorated can be used for the purpose of the invention, for example, double sided tapes having a base member and double sided tapes having no base member, although the invention is not limited to these materials. The lower layer material 13a is selected in view of the decoration piece and the object to be decorated.

Apparatus for Producing Decoration Piece

According to the present invention, a three-dimensional decoration piece 1 is produced by (1) high frequency dielectric heating the above described materials by means of a first table 31 and an upper mold 21, to produce a three-dimensionally formed body 14b (1st Step); and (2) pressing the three-dimensionally formed body 14b by means of a second table 41 and the upper mold 21 (2nd Step) to cut the lower layer material 13a, so as to form the three-dimensional decoration piece 1.

Now, the apparatus used in the present invention will be described below.

The apparatus according to the present invention comprises an upper mold 21 to be used in the first step and the second step, a first table 31 to be used in the first step, and a second table 41 to be used in the second step.

In the first step, the upper mold 21 functions as anode, while the first table 31 functions as cathode. In the second step, on the other hand, the upper mold 21 does not function as anode.

Although not shown, the first table 31 and the second table 41 may be made movable so as to be alternately placed below the upper mold 21 (table sliding method). Alternatively, a turn table may be used to make the first table 31 and the second table 41 movable. Any known method for moving the first table 31 and the second table 41 can be used for the purpose of the present invention.

The upper mold 21 is provided with cavities for defining a surface profile of the three-dimensional decoration piece. Cross sectional views of the cavities are not limited to the illustrated examples, and may show the shape of an inverted V, a semi-circle, a trapezoid or any other shape.

The upper mold 21 is provided with a first machining means 22 and a second machining means 23.

The first machining means 22 is functions as a fusion-cutting blade in the first step so as to fusion-cut the surface layer material 11a and the intermediate layer material 12a, and functions as a cutting blade in the second step of applying pressure without high frequency dielectric heating, so as to simply cut the lower layer.

The second machining means 23 functions as a pressing blade in the first step. The second machining means 23 is arranged when necessary. In other words, it is not essential.

Figure 4:
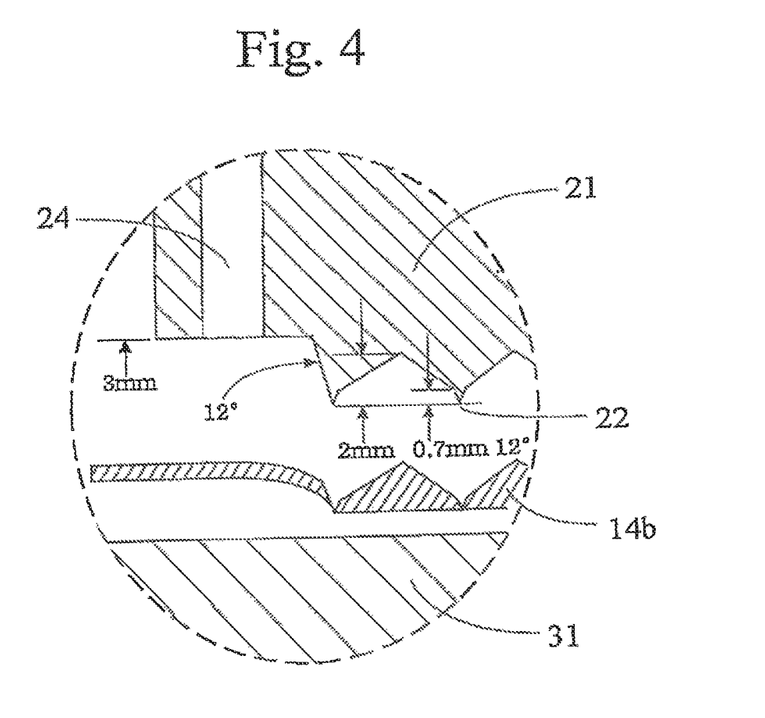
FIG. 4 is an enlarged schematic sectional view of part N in FIG. 3.

While some of the dimensions of the first machining means 22 and other members are shown in FIG. 4, the present invention is not limited to the dimensional values shown in FIG. 4.

Figure 1:
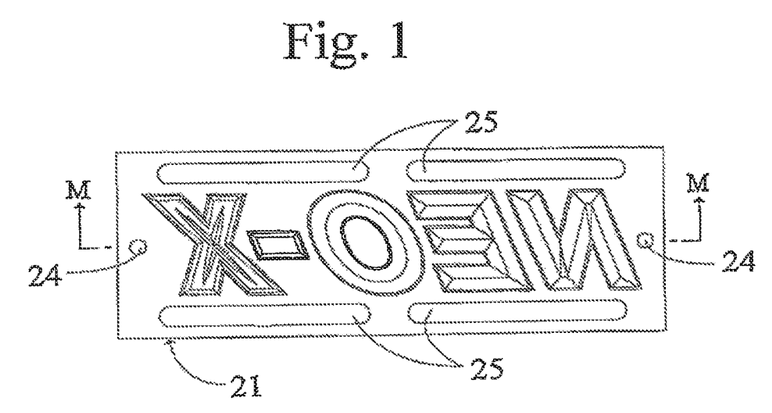
FIG. 1 is a schematic bottom view of an upper mold 21.

As shown in FIG. 1, the upper mold 21 is provided on a lower surface thereof with a temporary holding means 25. The temporary holding means 25 temporarily holds the three-dimensionally formed body 14b produced in the first step to the upper mold 21. The temporary holding means 25 may be, for example, an tackily bonding tape.

The upper mold 21 is provided with an aligning hole 24, A pin (not shown) are driven into the respective aligning holes 24 and the corresponding aligning holes 45 of the second table 41 which will be described hereinafter, in order to align the upper mold 21 and the second table 41.

The first table is operated as cathode in the first step, but it is not operated as such in the second step. A top surface of the first table is 31 a flat surface.

The upper mold 21 and the first table 31 operate for high frequency dielectric heating. Any known ones can be used for the purpose of the present invention.

The second table 41 is not used in the first step. In other words, it is used only in the second step. A top surface of the second table 41 is flat. The second table 41 is provided on the surface thereof with a recessed section.

Alternatively, as shown in the illustrated example, a lower mold 42 may be placed on the second table 41. The lower mold 42 has a flat top surface and a recessed section 43 on the top surface. This arrangement is convenient for instances where the current design of three-dimensional decoration piece is replaced by some other design, because only the lower mold needs to be replaced and it is not necessary to replace the second table 41.

Cushion members 51 are arranged in the respective recessed sections 43 to make the top surface of the lower mold 42 flat. A material that can absorb pressure such as rubber is employed for the cushion members. Because cushion members 51 are arranged, when the lower layer material 13a arranged on the lower mold 42 is pressed by the upper mold 21, the pressure is absorbed by the cushion members in the areas where the lower layer material 13a contacts with the cushion members 51. Therefore, the adhesive force of the lower layer material 13a is not degraded in the areas where the lower layer material 13a contacts with the cushion members 51.

If the cushion members are arranged at the positions where edge(s) of the first machining means 22 contacts them, the first machining means 22 can no longer cut the lower layer material 13a, because the pressure applied by the first machining means 22 is absorbed by the cushion members. Therefore, the positions of the cushion members and the positions the recessed sections 43 are important.

Each of the recessed sections 43 is arranged between a point 443 and a point 444. The edge of the blade of the first machining means 22 contacts with the top surface of the lower mold 42 at points 441, 442. Each of the points 443 and 444 is positioned transversally (in a direction indicated by an arrow U in FIG. 10) and inwardly separated from the points 441, 442 by 0.2 mm to 1 mm. In other words, a distance between the point 441 and the point 443 is between 0.2 mm and 1 mm. If the recessed section 43 (the cushion member 51) is arranged in a region separated from the positions 441, 442 only by less than 0.2 mm, the edge of the first machining means 22 may be positioned above the cushion member 51, in case that the upper mold 21 and the lower mold 42 (second table 41) are relatively displaced from each other a little. In such a case, the edge can no longer cut the lower layer material 13a. If, contrary, the recessed section 43 (the cushion member 51) is arranged in a region separated from the positions 441, 442 by more than 1 mm, the area to which the lower layer material 13a applies pressure becomes large, to consequently degrade the tacky bonding properties of the lower layer material 13a.

Figure 10:
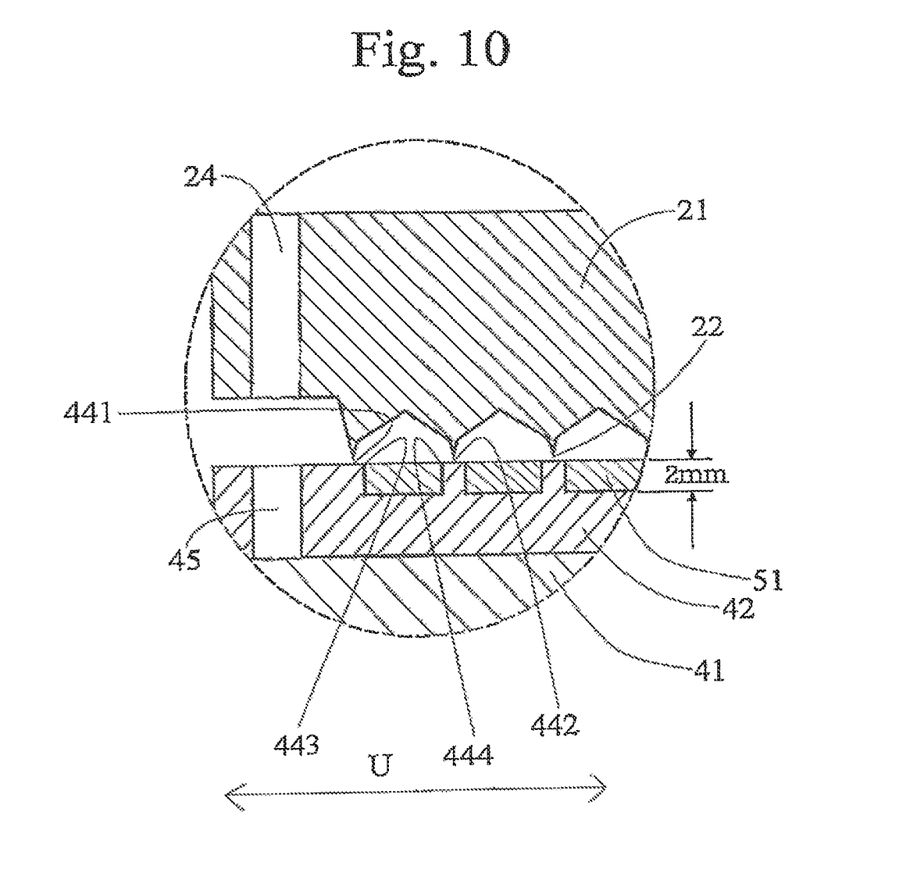
FIG. 10 is an enlarged selective of part X in FIG. 9 from which the three-dimensionally formed body and the lower layer material are not shown.

A depth of the recessed sections 43 is preferably between 1 mm and 5 mm. While FIG. 10 shows the depth of the recessed sections 43 is 2 mm, the depth is not limited to 2 mm. When the depth of the recessed sections 43 (and hence the thickness of the cushion members 51) is less than 1 mm, the cushion member 51 cannot sufficiently absorb the pressure applied to them. When, on the other hand, the depth is more than 5 mm, the cushion member 51 is depressed to produce a gap between the cushion member 51 and the lower layer material 13a. Then, the bottom surface of the lower layer material 13a may not be flat.

In other words, the pressure applied by the upper mold 21 is absorbed, and the tacky bonding properties of the lower layer material 13a is prevented from being degraded, by arranging the cushion member 51 in regions other than a portion where the lower layer material 13a is cut.

The lower mold 42 (or the second table 41) is provided with an aligning hole 45. The pin (not shown) is arranged into the aligning hole 45 of the second table 41 and the corresponding aligning holes 24 of the upper mold 21, to align the upper mold 21 and the lower mold 42 (second table 41).

Method for Producing the Decoration Piece

According to the present invention, the three-dimensional decoration piece is produced by means of an apparatus as described above in a manner as described below.

Figure 2:
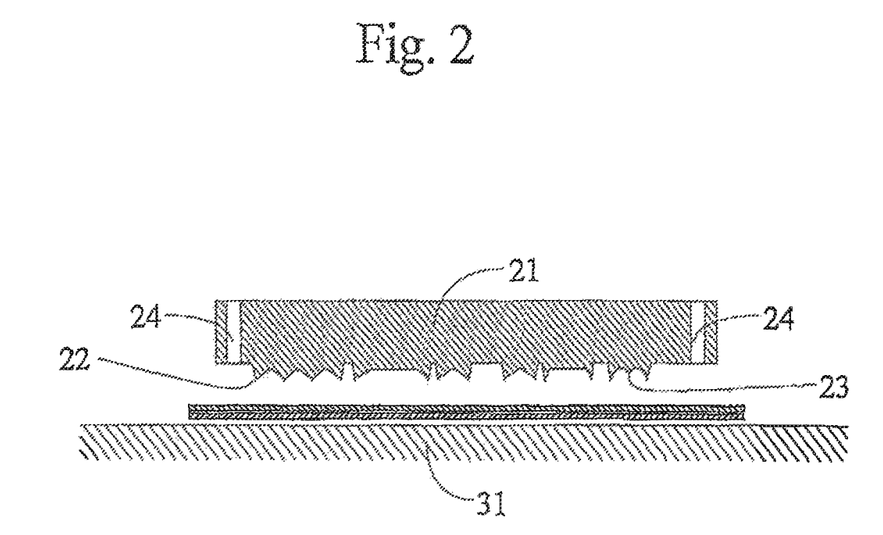
FIG. 2 is a schematic sectional view taken along line M-M in FIG. 1 that schematically illustrates a state before the high frequency dielectric heating of the first step.

In the illustrated example, the intermediate layer material 12a is put on the first table 31, and the surface layer material 11a is put on the intermediate layer material 12a, as shown in FIG. 2. In this stage, the lower layer material 13a is not put.

While the surface layer material 11a is put on the intermediate layer material 12a in the illustrated example, the surface layer material 11a may be laid on the intermediate layer material 12a in advance to integrally combine the two materials to produce a layered set of materials, which is then on the first table 31. The intermediate layer material 12a may be omitted, if the surface layer material 11a has a thickness sufficient for filling the cavity of the upper mold 21.

Figure 3:
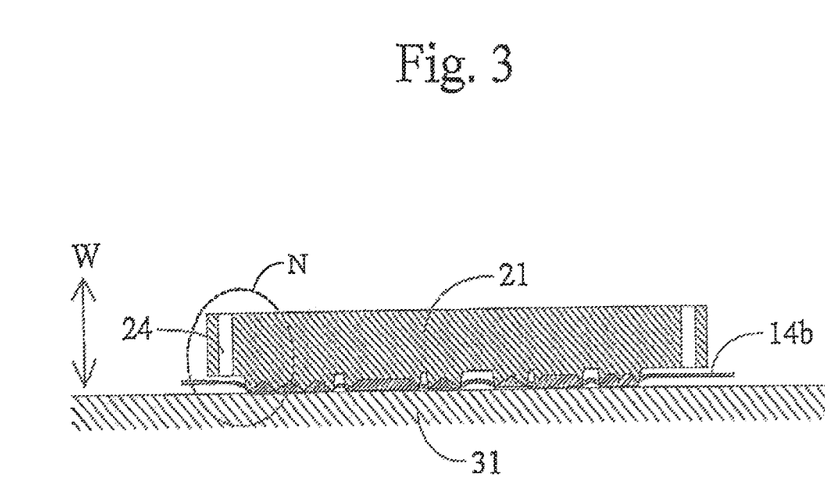
FIG. 3 is a schematic sectional view taken along line M-M in FIG. 1 that schematically illustrates a state during the high frequency dielectric heating of the first step.

Then, as shown in FIG. 3, the upper mold 21 is lowered to press the surface layer material 11a and the intermediate layer material 12a, and a high frequency wave is transmitted by using the upper mold 21 and the first table 31 respective as anode and cathode. The surface layer material 11a and the intermediate layer material 12a are heated and molten. The surface layer material 11a and the intermediate layer material 12a are molten as a result of being heated, and then flow into the cavity of the upper m,old 21 so as to take the designed shape. The surface layer material 11a and the intermediate layer material 12a are fusion-bonded to make a three-dimensionally formed body 14b.

The three-dimensionally formed body 14b (the surface layer material 11a and the intermediate layer material 12a) is fusion-cut by the first machining means 22.

The formed three-dimensionally formed body 14b has the designed shape by the upper mold 21. Since the top surface of the first table 31 is flat as described above, a bottom surface of the three-dimensionally formed body 14b is flat. Therefore, the three-dimensionally formed body produced by the method of the present invention has a large area that can be used for adhesion or tackily bonding, to consequently provide a sufficient adhesion or tackily bonding strength.

Additionally, the three-dimensionally formed body 14b is temporarily held to the upper mold 21 by the temporary holding means 25. If the temporary holding means 25 is a tacky bond tape, the three-dimensionally formed body 14b is temporarily held to the upper mold 21 by the pressure applied by the upper mold 21 and the tackily bonding force of the temporary holding mean 25.

When the three-dimensionally formed body 14 is made to take the designed shape and temporarily held to the upper mold 21, the high frequency dielectric heating is stopped.

Figure 8:
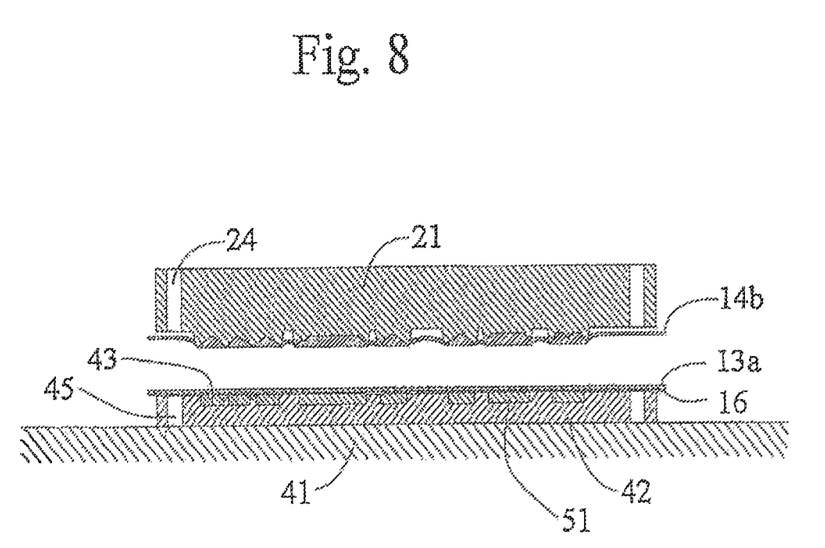
FIG. 8 is a schematic illustration of a state before pressing of the second step, specifically cross sectional views taken along line P-P of the lower mold 42 and corresponding respective sectional views of the upper mold, a three-dimensionally formed body and a lower layer material.

The lower layer material 13a is put on the second table 41. In the illustrated example, the lower mold 42 is placed on the second table 41. In the illustrated example, the lower layer material 13a having a sheet of release paper 16 fitted to the rear surface thereof is put on the lower mold 42 (FIG. 8).

Then, the first table 31 arranged below the upper mold 21 is moved away, and the second table 41 is moved to below the upper mold 21. It is convenient that the first table 31 and the second table 41 are slidable, and can be moved to and away from below the upper mold 21.

Figure 5:
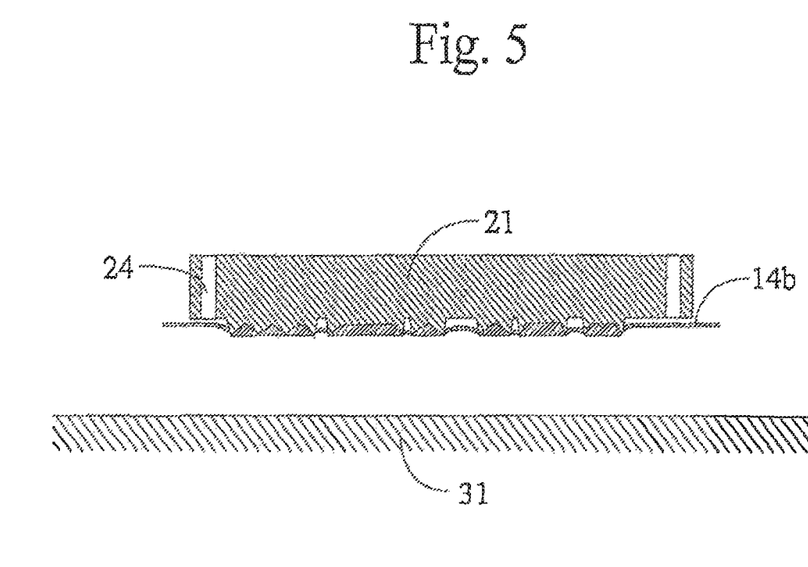
FIG. 5 is a schematic sectional view taken along line M-M in FIG. 1 that schematically illustrates a state after the high frequency dielectric heating of the first step.
Figure 6:
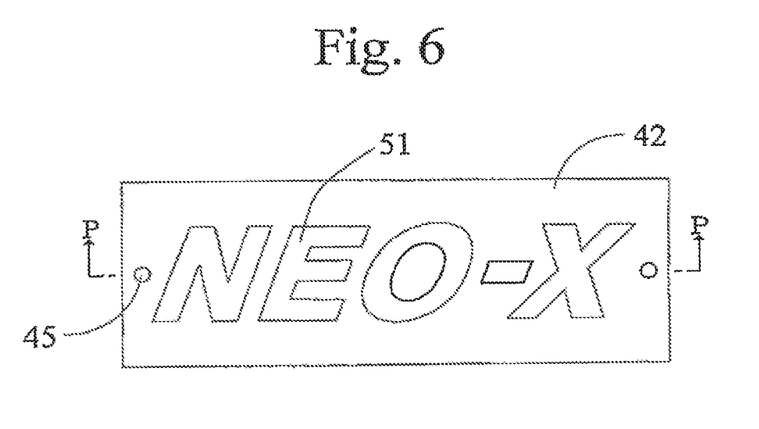
FIG. 6 is a schematic plan view of a lower mold 42.
Figure 7:
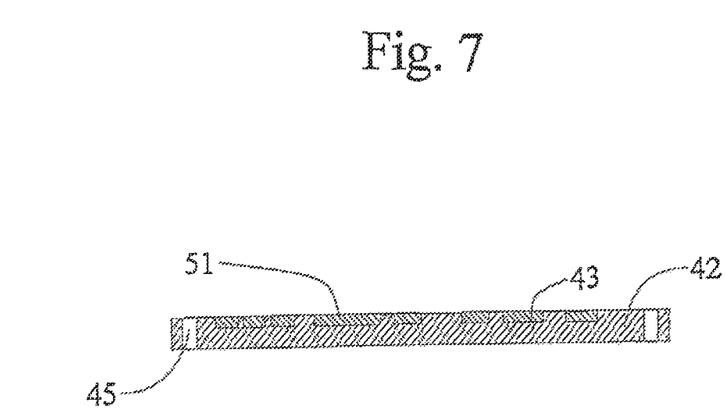
FIG. 7 is a schematic sectional view taken along line P-P of the lower mold 42 in FIG. 6.

In the illustrated example, firstly the upper mold 21 is pulled up with the three-dimensionally formed body 14b (FIG. 5), and the first table is moved away. Subsequently, the second table 41 and the lower mold 42 is moved to below the upper mold 21 (FIG. 8). Note that the three-dimensionally formed body 14b is temporarily held to the upper mold 21 by the temporary holding means 25.

Figure 9:
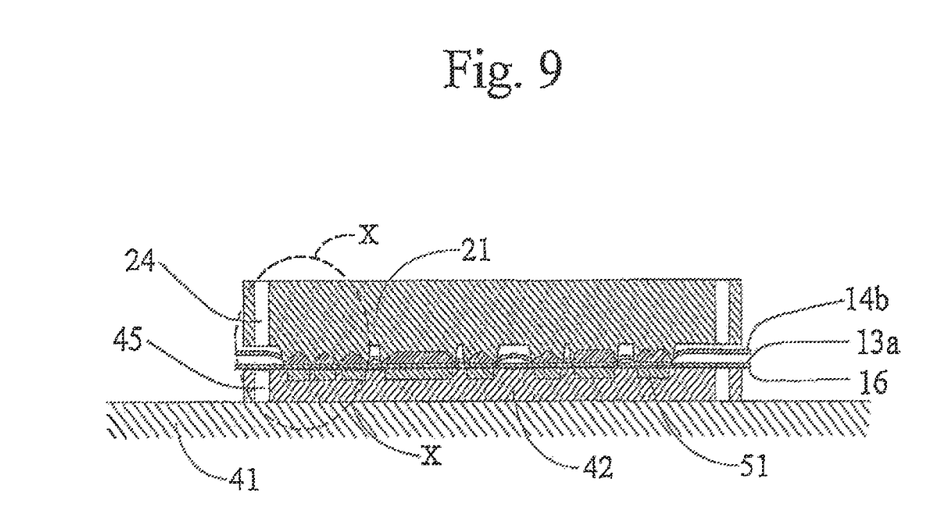
FIG. 9 is a schematic illustration of a state during the pressing of the second step, specifically a sectional view taken along line P-P of the lower mold 42 and corresponding respective sectional views of the upper mold, the three-dimensionally formed body and the lower layer material.

As shown in FIG. 9, the upper mold 21 is lowered to press the three-dimensionally formed body 14b and the lower layer material 13a. In this case, high frequency wave is not emitted.

Since pins (not shown) are driven into the respective aligning holes 24 of the upper mold 21 and the aligning holes 45 of the lower mold 42 at this time, the upper mold 21 and the lower mold 42 are aligned. After the upper mold 21 and the lower mold 42 are anchored, the pins are pulled away.

As a result of the pressing, the three-dimensionally formed body 14b and the lower layer material 13a are tackily bonded to each other and integrally combined due to the tacky adhesive force of the lower layer material 13a.

Due to the pressing, the lower layer material 13a is cut by the first machining means 22 of the upper mold 21. In the illustrated example, no cushion members 51 are found at the positions where the edges of the blades of the first machining means 22 contact the lower layer material 13a, so that the lower layer material 13a can be cut with ease. On the other hand, the applied pressure is absorbed by the cushion members 51 in the regions where the cushion members 51 are placed. Therefore, the tacky adhesive force of the lower layer material 13a is not degraded in the regions where the cushion members 51 are placed. While the tacky adhesive force of the lower layer material 13a is degraded as pressure is applied thereto, such degradation can be prevented according to the present invention.

Thus, preferably cushion members 51 are arranged in the regions located outside the areas where the lower layer material 13a is cut The cushion members 51 absorb the pressure applied by the upper mold 21, to prevent the tacky adhesive force of the lower layer 13 from being degraded further.

The releasing paper 16 is not cut by the first machining means 22, but stretched to a slight extent.

Figure 11:
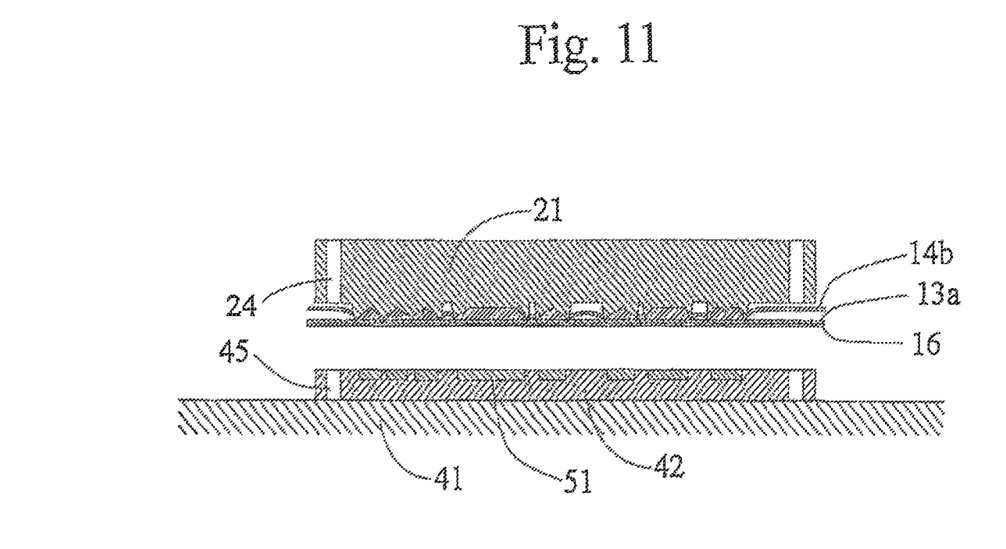
FIG. 11 is a schematic illustration of a state after the pressing of the second step, specifically a sectional view taken along line P-P of the lower mold 42 and corresponding respective cross sectional views of the upper mold, the three-dimensionally formed body and the lower layer material.

Thereafter, the upper mold 21 is pulled up (FIG. 11).

The three-dimensionally formed body 14b and the lower layer material 13a that are now integrally combined is moved away from the upper mold 21, and unnecessary parts thereof are removed.

Subsequently, the application film 15 is attached to the top surface of the upper layer 11.

What is claimed is:

1. An apparatus configured to produce a three-dimensional decoration piece of thermoplastic synthetic resin according to a method comprising:

putting an upper layer material on a first table operating as cathode;

lowering an upper mold operating as anode onto the first table to press the upper layer material, emitting a high frequency wave for dielectric heating, to form a three-dimensionally formed body from the upper layer material by molding and fusion-cutting and temporarily holding the three-dimensionally formed body to the upper mold;

stopping the high frequency dielectric heating;

moving a second table carrying a lower layer material having a tacky bonding property to below the upper mold temporarily holding the three-dimensionally formed body; and lowering said upper mold onto the second table to press the three-dimensionally formed body cutting the lower layer material and tacky bonding the three-dimensionally formed body and the lower layer material, so that the lower layer material is not subjected to any high frequency dielectric heating, and is not heated, the apparatus comprising:

said upper mold having a blade on the lower surface side, wherein the blade has spaced-apart, multiple blade edges configured for fusion-cutting the upper layer material at the time of high frequency dielectric heating between the upper mold and the first table;

and cutting the lower layer material at the time of pressing between the upper mold and the second table;

said upper mold being provided on a bottom surface thereof with a temporary holding means;

said second table having a flat top surface containing recessed sections formed alternately, the recessed sections each filled with a cushioning member;

wherein the blade and the flat top surface are configured such that the blade edges are able to contact only that part of the flat top surface having no recessed sections, each of the recessed sections being transversally and inwardly separated from a position where the blade edge contacts with the flat top surface, by 0.2 mm to 1 mm; and said lower layer material is cut by said blade edges in direct contact with the flat top surface without cushion members.

2. The apparatus according to claim 1, wherein the recessed sections have a depth of between 1 mm and 5 mm.

3. An apparatus configured to produce a three-dimensional decoration piece of thermoplastic synthetic resin according to a method comprising:

putting an upper layer material on a first table operating as cathode;

lowering an upper mold operating as anode onto the first table to press the upper layer material, emitting a high frequency wave for dielectric heating, to form a three-dimensionally formed body from the upper layer material by molding and fusion-cutting and temporarily holding the three-dimensionally formed body to the upper mold;

stopping the high frequency dielectric heating;

moving a second table carrying a lower layer material having a tacky bonding property to below the upper mold temporarily holding the three-dimensionally formed body; and lowering said upper mold onto the second table to press the three-dimensionally formed body cutting the lower layer material and tacky bonding the three-dimensionally formed body and the lower layer material, so that the lower layer material is not subjected to any high frequency dielectric heating, and is not heated, the apparatus comprising:

said upper mold having a blade on the lower surface side, wherein the blade has spaced-apart, multiple blade edges configured for fusion-cutting the upper layer material at the time of high frequency dielectric heating between the upper mold and the first table;

and cutting the lower layer material at the time of pressing between the upper mold and the second table;

said upper mold being provided on a bottom surface thereof with a temporary holding means;

a lower mold arranged on the second table, the lower mold having a flat top surface containing recessed sections formed alternately, the recessed sections each filled with a cushioning member;

wherein the blade and the flat top surface are configured such that the blade edges are able to contact only that part of the flat top surface having no recessed sections, each of the recessed sections being transversally and inwardly separated from a position where the blade edge contacts with the flat top surface, by 0.2 mm to 1 mm; and said lower layer material is cut by said blade edge in direct contact with the flat top surface without cushion members.

4. The apparatus according to claim 3, wherein the recessed sections have a depth of between 1 mm and 5 mm.

* * * * *